(12) United States Patent
Tang et al.

(10) Patent No.: US 9,457,599 B2
(45) Date of Patent: Oct. 4, 2016

(54) PRINTER WITH INK CONTROL

(71) Applicant: HEWLETT-PACKARD DEVELOPMENT COMPANY, L.P., Houston, TX (US)

(72) Inventors: Chee Tee Tang, Singapore (SG); Tao Long, Singapore (SG); Sook Shin Chang, Singapore (SG); Kok Chai Chong, Singapore (SG)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 14/785,064

(22) PCT Filed: Jun. 27, 2013

(86) PCT No.: PCT/US2013/048103
§ 371 (c)(1),
(2) Date: Oct. 16, 2015

(87) PCT Pub. No.: WO2014/209313
PCT Pub. Date: Dec. 31, 2014

(65) Prior Publication Data
US 2016/0082752 A1    Mar. 24, 2016

(51) Int. Cl.
*B41J 13/00* (2006.01)
*G06K 15/10* (2006.01)
*B41J 2/205* (2006.01)
*B41J 11/00* (2006.01)

(52) U.S. Cl.
CPC ........... *B41J 13/0009* (2013.01); *B41J 2/2054* (2013.01); *B41J 11/001* (2013.01); *B41J 11/006* (2013.01); *G06K 15/105* (2013.01); *G06K 15/107* (2013.01)

(58) Field of Classification Search
None
See application file for complete search history.

(56) References Cited

U.S. PATENT DOCUMENTS

| 6,261,010 B1* | 7/2001 | Maeda | B41J 11/008 400/120.02 |
|---|---|---|---|
| 6,406,127 B1 | 6/2002 | Mandel | |
| 6,543,872 B2 | 4/2003 | Ohtsuka et al. | |
| 7,901,025 B2 | 3/2011 | Kato et al. | |
| 2005/0093901 A1* | 5/2005 | Yraceburu | B41J 2/2132 347/9 |
| 2005/0104915 A1* | 5/2005 | Hara | B41J 2/2132 347/14 |
| 2008/0192075 A1* | 8/2008 | Campion | B41J 2/16552 347/104 |
| 2011/0134177 A1 | 6/2011 | Konno et al. | |

(Continued)

FOREIGN PATENT DOCUMENTS

| CN | 1385304 | 12/2002 |
|---|---|---|
| CN | 102233722 | 11/2011 |

(Continued)

OTHER PUBLICATIONS

ISR/WO, PCT/US2013/0418103, HP reference 83270239, Mar. 17, 2014: 9 pps.

*Primary Examiner* — Justin Seo
(74) *Attorney, Agent, or Firm* — HP Inc Patent Department

(57) ABSTRACT

A printer is disclosed. The printer determines the width of media to be printed on. When the width of the media is below a threshold the printer prints using multiple printing passes where the amount of ink is divided between the multiple printing passes with a first distribution. When the width of the media is not below the threshold the printer prints using multiple printing passes where the amount of ink is divided between the multiple printing passes with a second, different distribution.

12 Claims, 5 Drawing Sheets

(56) References Cited

U.S. PATENT DOCUMENTS

| | | | | |
|---|---|---|---|---|
| 2011/0316920 | A1* | 12/2011 | Torigoe | B41J 29/393 347/14 |
| 2012/0188609 | A1* | 7/2012 | Kuno | G06K 15/188 358/3.02 |
| 2014/0210886 | A1* | 7/2014 | Driggers | B41J 11/0095 347/13 |

FOREIGN PATENT DOCUMENTS

| | | |
|---|---|---|
| EP | 1310905 | 5/2003 |
| JP | 111007 | 1/1999 |
| JP | 2005074942 | 3/2005 |
| JP | 2010072857 | 4/2010 |
| KR | 20020088055 | 11/2002 |

* cited by examiner

PRINTER WITH INK CONTROL

BACKGROUND

Many inkjet printers print images on media by sweeping printheads back and forth across the width of the media while depositing printing fluid on each pass. Some inkjet printers advance the page after each sweep. These types of inkjet printers deposit all the ink for that segment of the page in each sweep. Other inkjet printers may make multiple passes or sweeps with the printheads over the same place on the media while depositing some of the printing fluid for each segment in each pass.

DETAILED DESCRIPTION

Figure 1:
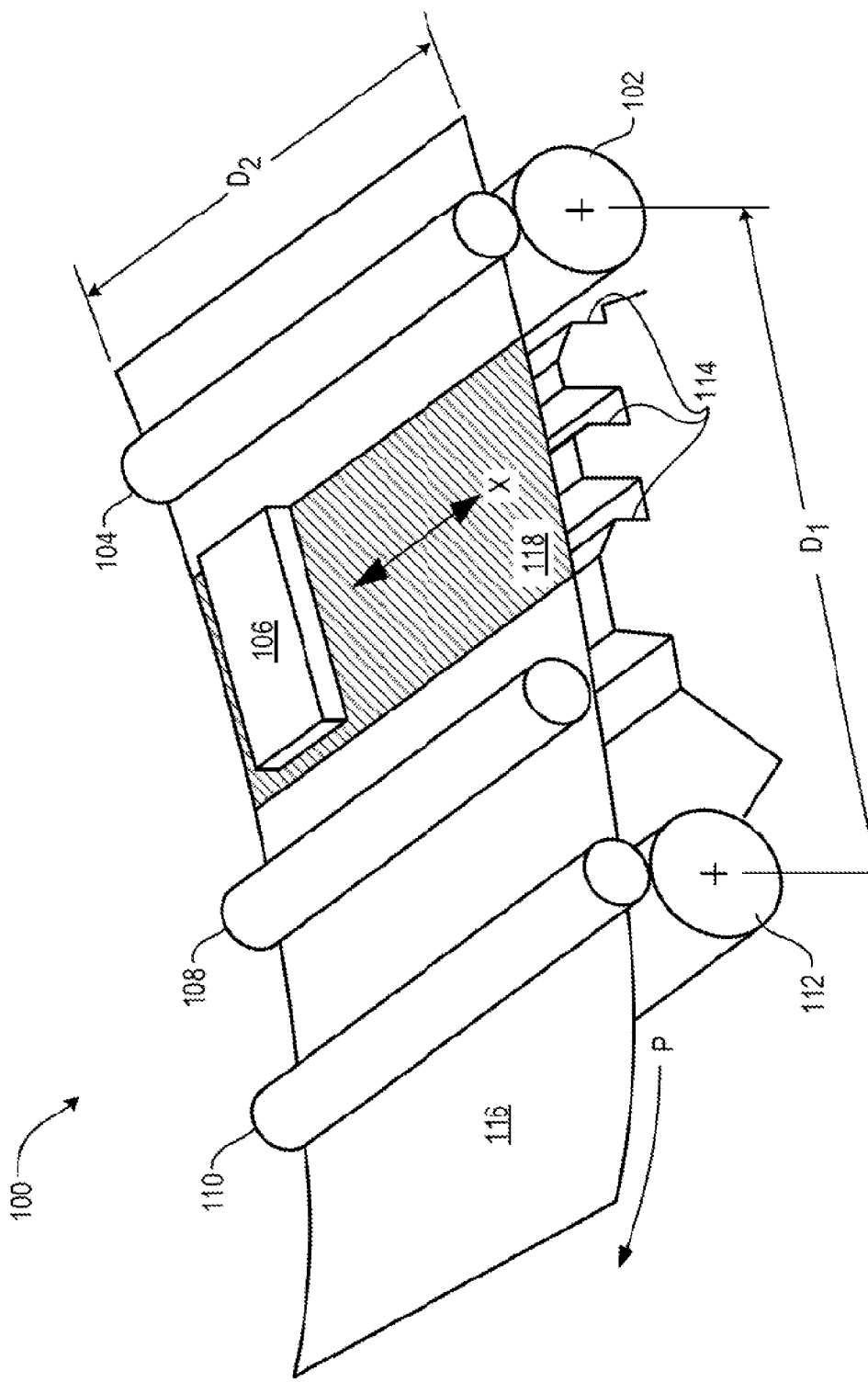
FIG. 1 is an isometric partial view of an example inkjet printer 100.

Papers come in many different sizes, for example letter, legal, ledger, A5, A4 and A3 sized papers. Most of the common page sizes used in the home or office have a width that is 8.5 inches or less, for example letter, legal, A5 and A4 pages all have a width of 8.5 inches or less. Because the most common paper sizes used in the home or office have widths of 8.5 inches or less, most home or office printers can only print on media with a width of 8.5 inches or less.

A user that has a need to print on wider pages can purchase a printer that has an oversized width, for example a B-sized printer. A typical B-sized printer has a width that is greater than 11.7 inches. This allows the printer to accommodate both ledger or B-sized pages (11×17 inches) and A3 pages (11.7×16.5 inches). Most B-sized printers can also use media with smaller widths, for example letter, legal, A5 and A4 sizes. Some B-sized inkjet printers have a higher rate of printhead crushing when printing B-sized media than when printing media with a smaller width.

Printhead crushing occurs when the printhead contacts the media as it is sweeping across the media during a printing pass or a retraction pass. A printing pass is defined as when the printhead is sweeping across the media while depositing ink. Ink is broadly defined as any type of printing fluid where printing fluid can be any color of ink, a gloss coat, an under coat, specialty inks or the like. In some printers a printing pass can be done as the printhead sweeps across the media in either direction. In other printers a printing pass is only done when the printhead is moving in one direction towards one side of the media. The printhead is then moved back to the other side of the media without depositing any ink. A retraction pass is defined as when the printhead is sweeping across the media without depositing ink onto the media.

Printhead crushing can cause a number of problems. Printhead crushing can cause streaks or smudges in the printed image. It can damage or shorten the life of the printhead. And it can cause the printhead to catch or crumple the media, potentially causing a media jam in the paper path of the printer.

Printhead crushing occurs more often when printing on wider paper for a number of reasons. One reason is that the paper fibers or grains are typically aligned differently in wide paper compared to narrower paper. For example, the grains in an A3 sized page are typically aligned perpendicular to the length of the page. The grains in a letter sized page are typically aligned parallel with the length of the page. When the paper gets wet the paper fibers or grains expand along the length of the fibers causing the paper to curl. For pages with the paper fibers or grains aligned parallel with the length of the page the curl is along the length of the page. For pages with the paper fibers or grains aligned perpendicular to the length of the page the curl is along the width of the page.

Curl along the length of a page is less of a problem than curl along the width of a page due to a number of factors. One factor is the typical geometry of an inkjet printer. Many inkjet printers have a pinch roller on either side of the print zone. The print zone is the area covered by the printheads as they sweep across the media while depositing ink. The pinch rollers keep tension in the page along the length of the page inside the print zone. When the paper fibers expand along the length of the page the tension along the length of the page keeps the surface of the page flat. When the paper fibers are aligned perpendicular to the length of the page the fibers cause the width of the page to increase when they expand. This causes curl along the width of the page. Tension along the length of the page does not prevent the page from curling along the width of the page. Typically nothing in the printer puts tension along the width of the page.

Another geometric factor that causes the curl along the width of the page to be more of a problem is the print zone dimensions. The distance in the print zone along the width of the page is greater for B-sized media than for letter sized media. B-sized pages are typically 3 inches wider than letter sized pages. Because B-sized pages are wider, it takes longer for the printhead to sweep across the entire print zone. This increases the amount of time the wet media remains in the print zone and increases the time between printing passes. The increase in time can cause more curl.

Printhead crushing can be reduced by moving the page out of the print zone after the ink has been deposited onto the media. For example, the printhead can make a printing pass across the media by depositing a swath of ink onto the media. The freshly printed swath can then be advanced out of the print zone before the printhead makes another printing pass or a retraction pass across the media. This works well for printers that print using a single printing pass.

Many printers use multiple printing passes over the same area of the media to deposit all the ink for the image onto the media. Some printers use two printing passes to deposit all the ink to a given area of the page. Other printers may use 3, 4 or more printing passes to deposit all the ink to a given area of the page. In some cases the printers use a retraction pass between each printing pass such that the printing passes are all moving in the same direction.

Typically each printing pass deposits the same amount of ink. For example, a two pass printer would deposit 50% of the ink on the first printing pass and 50% of the ink on the second printing pass. A four pass printer would deposit 25% of the ink during each printing pass. Depositing the same percentage of the total amount of ink for a given segment of the image is known as an even distribution of ink. In one example of the invention, a printer will use an uneven distribution of ink deposited in each pass when printing on wide media. Depositing different percentages of the ink in different passes for a given segment of the image is known as an uneven distribution of ink. In one example of the invention the uneven distribution will have more ink deposited in the last pass than in other passes. For example, when a two pass printer is printing on wide media the amount of ink deposited on the first printing pass will be less that the amount of ink deposited in the second printing pass. A four pass printer will have more ink deposited in the $4^{th}$ printing pass than in each of the other three printing passes.

FIG. 1 is an isometric partial view of an example inkjet printer 100. Inkjet printer 100 comprises a pair of linefeed pinch rollers 102 and 104, a carriage 106, a starwheel pinch roller 108, a pair of take-up pinch rollers 110 and 112 and some support ribs 114. The drawing is for illustration purposes only and is not to scale. The pair of linefeed pinch rollers (102 and 104), the starwheel pinch roller 108 and the pair of take-up pinch rollers (110 and 112) make up a media feeding system in this example. A media feeding system is any set of parts that direct media into and through a print zone. The linefeed pinch rollers 102 and 104 feed paper into a print zone shown as area 118. The support ribs 114 support the paper in the print zone. As the paper is fed past the print zone 118, the starwheel pinch roller directs the leading edge of the paper towards the take-up pinch rollers 110 and 112.

Once the leading edge of the paper reaches the take-up pinch rollers (110 and 112) the actions of the linefeed pinch rollers (102 and 104) can be coordinated with the actions of the take-up pinch rollers (110 and 112) to put tension along the length of the page in the print zone 118. A page 116 is shown loaded in the paper path between the linefeed pinch rollers and the take-up rollers. The paper feeding direction is along the length of the page and is shown by arrow P. In one example the distance D1 between the linefeed pinch rollers (102 and 104) and the take-up rollers (110 and 112) is approximately between 3 to 3.5 inches.

Carriage 106 is mounted in a drive system (see FIG. 2) that moves carriage 106 back and forth across the width of the page along axis X. One or more printheads mounted in carriage 106 deposit ink onto the page as the carriage sweeps across the page (see FIG. 3). Print zone 118 is the area covered by the printheads as they sweep across the media while depositing ink. In one example the printheads are 1.15 inches long (see distance D3 in FIG. 3). Therefore the print zone 118 is 1.15 inches wide along the axis of the paper movement (direction P). The length of the print zone (distance D2) for a B-sized printer is slightly larger than 11.7 inches in length.

Printer 100 may have multiple printing modes. In some printing modes the carriage makes only one printing pass across each section of the page while depositing all the ink for that section in one swath. In this printing mode the paper is advanced after each printing pass. In a multi-pass printing mode the printer may make multiple printing passes across each segment of the page, depositing some portion of the ink for that segment with each printing pass. Once the last printing pass in the multi-printing mode has been completed, the media can be advanced such that the area just printed is moved out of the print zone before the printhead makes another pass across the print zone. In other print modes the ink of on swath may overlap with the ink of previous swaths. In print modes with overlapping swaths only part of the swath is moved out of the print zone after the last printing pass.

In one example, printer 100 uses an uneven ink distribution across the multiple printing passes in the multi-pass printing mode when printing on wide media. Using an uneven ink distribution, printer 100 concentrates more of the ink into the last printing pass. By concentrating more of the ink into the last printing pass the amount of curl caused during earlier printing passes will be reduced. Therefore the amount of head crushing in the earlier printing passes will also be reduced. Because the paper can be moved out of the print zone after the last printing pass, the increase in the amount of ink used in the last printing pass will not increase the amount of printhead crushing. Therefore the total amount of head crushing will be reduced.

Figure 2:
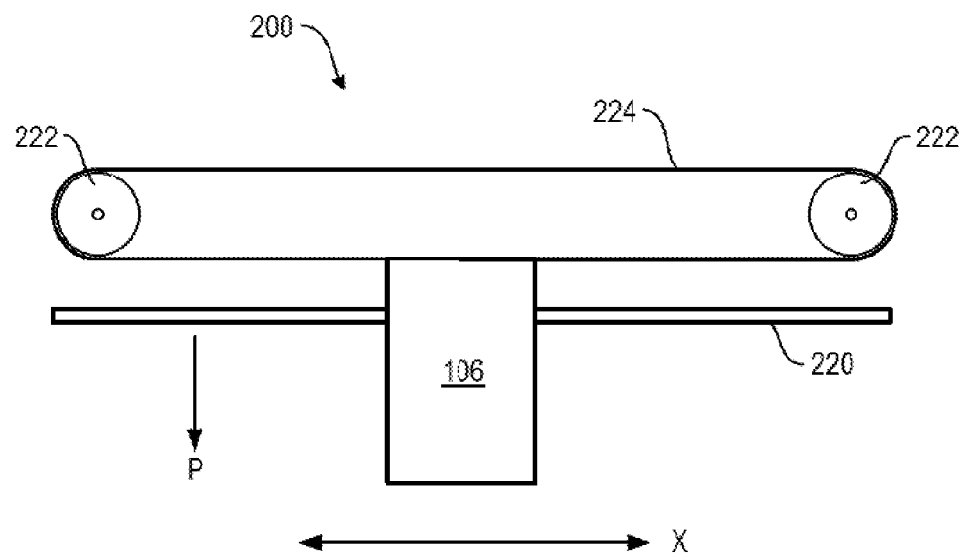
FIG. 2 is a top view of an example drive system.

FIG. 2 is a top view of an example drive system. Drive system 200 comprises guide rod 220, two drive gears 222 and drive belt 224. Carriage 106 is mounted on guide rod 220 and can translate on guide rod 220 along axis X. Drive gears 222 are mounted on each side of the printer. Drive belt 224 is attached to carriage 106 and looped around the two drive gears 220. One of the two drive gears 222 is attached to a motor (not shown) that turns the drive gear. As the drive gear rotates, the carriage 106 is moved along the guide rod 220 in the X axis. In other examples, drive system 200 may use a worm drive instead of a drive belt.

Figure 3:
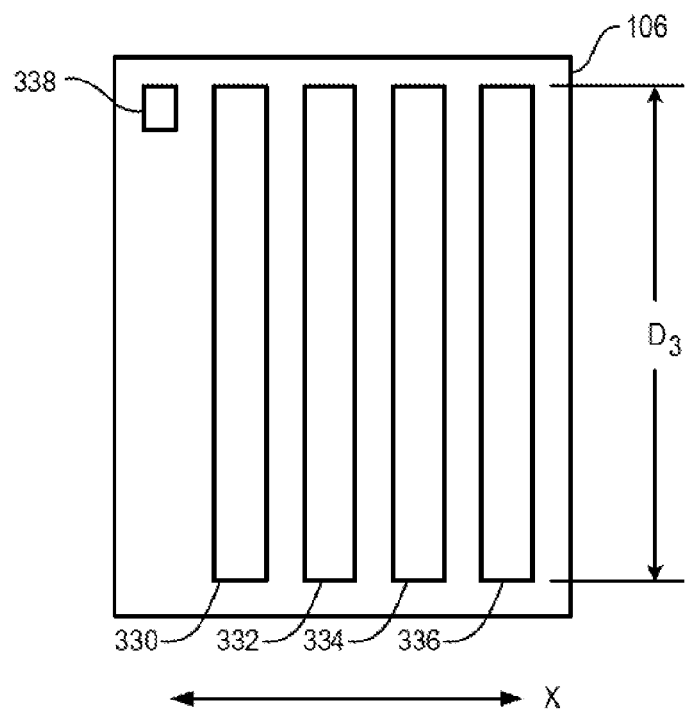
FIG. 3 is a bottom view of an example carriage 106.

FIG. 3 is a bottom view of an example carriage 106. Mounted to the bottom side of carriage 106 are four printheads (330, 332, 334 and 336). In this example each printhead is used to deposit a single color of ink onto media as the carriage moves along the X axis. Printheads 330, 332, 334 and 336 are used to deposit cyan, magenta, yellow and black ink, respectively. In some examples there may be additional printheads used to deposit other ink colors onto the media. The additional ink colors may include, light cyan ink, light magenta ink, light yellow ink, light grey ink and the like. In other examples a single printhead may be used to deposit all of the differently colored inks onto the media. The printheads may be removably mounted to the carriage and user replaceable or may be permanently attached to the carriage. The four printheads (330, 332, 334 and 336) have length D3. Distance D3 is typically between 0.5 inches and 2 inches, for example 1.15 inches.

Carriage 106 also has a sensor 338 mounted to the bottom surface. Sensor 338 can view media as the carriage travels back and forth across the print zone 118. Using sensor 338, the printer can determine the width of the media loaded in the print zone 118. In other examples the printer may determine the media width using other sensors located in other places within the printer paper path, for example in a media tray. In yet another example, the printer may determine the width of the media being used by examining the data contained in the print job sent to the printer.

Figure 4:
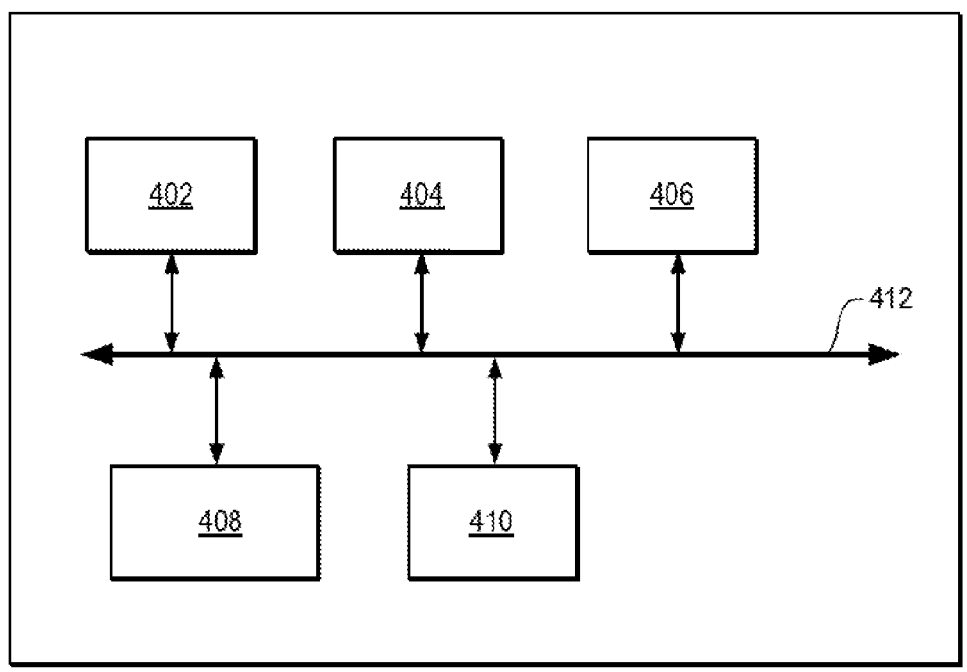
FIG. 4 is an example block diagram of a printer.

FIG. 4 is an example block diagram of a printer. Printer comprises a processor 402, memory 404, input/output (I/O) module 406, print engine 408 and controller 410 all coupled together on bus 412. In some examples printer may also have a user interface module, an input device, and the like, but these items are not shown for clarity. Processor 402 may comprise a central processing unit (CPU), a micro-processor, an application specific integrated circuit (ASIC), or a combination of these devices. Memory 404 may comprise volatile memory, non-volatile memory, and a storage device. Memory 404 is a non-transitory computer readable medium. Examples of non-volatile memory include, but are not limited to, electrically erasable programmable read only memory (EEPROM) and read only memory (ROM). Examples of volatile memory include, but are not limited to, static random access memory (SRAM), and dynamic random access memory (DRAM). Examples of storage devices include, but are not limited to, hard disk drives, compact disc drives, digital versatile disc drives, optical drives, and flash memory devices.

I/O module 406 is used to couple printer to other devices, for example the Internet or a computer. Printer has code, typically called firmware, stored in the memory 404. The firmware is stored as computer readable instructions in the non-transitory computer readable medium (i.e. the memory 404). Processor 402 generally retrieves and executes the instructions stored in the non-transitory computer-readable medium to operate the printer and to execute functions. In one example, processor executes code that controls the amount of ink deposited in each printing pass.

Figure 5:
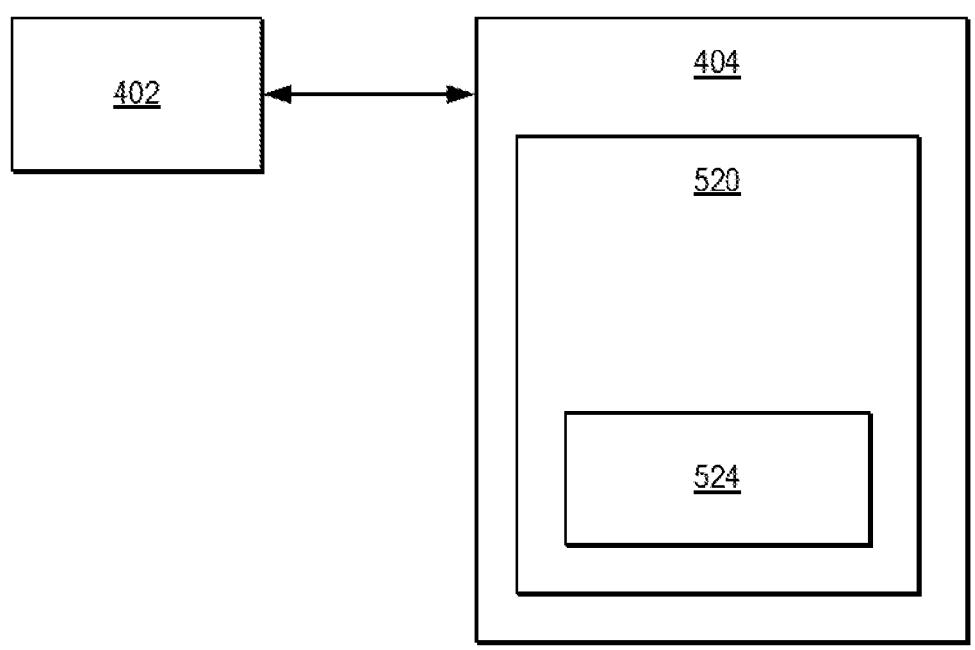
FIG. 5 is an example block diagram of the processor 402 coupled to memory 404.

FIG. 5 is an example block diagram of the processor 402 coupled to memory 404. Memory 404 contains software 520. Software 520 contains an ink control module 524. The processor 402 executes the code in ink control module 524 to control the amount of ink deposited in each printing pass.

Figure 6:
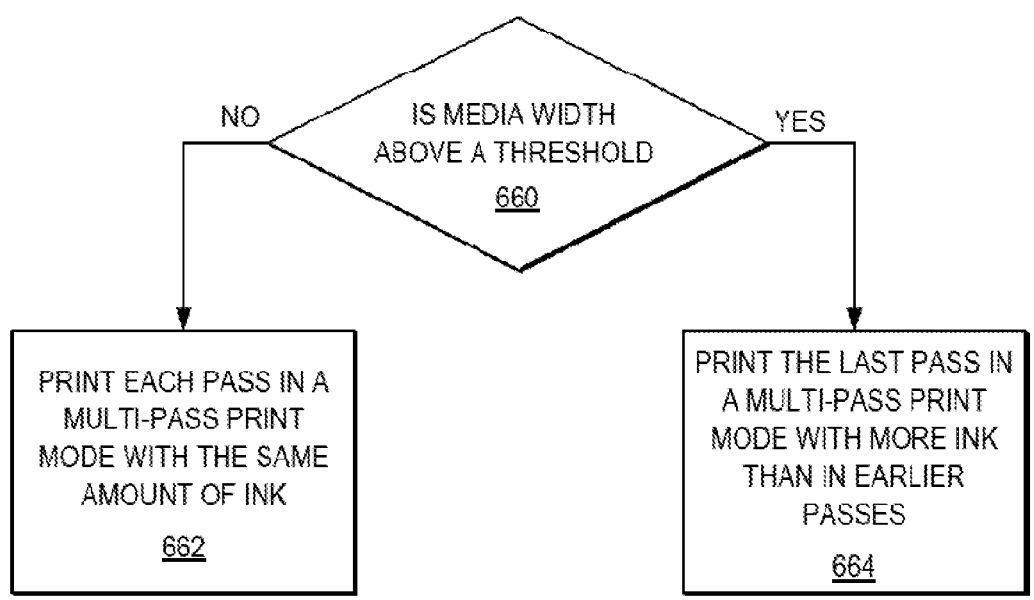
FIG. 6 is an example flow chart for controlling the amount of ink deposited in each printing pass.

A printer may use different print modes for different areas of a page, depending on what is being printed in that area. For example, when printing text or simple graphics the printer may use a single pass printing mode. When printing images, for example a photograph, the printer may use a multi-pass printing mode. FIG. 6 is an example flow chart for an ink control module. The ink control module is used for controlling the amount of ink deposited in each printing pass when using a multi-pass print mode. Flow start at 660 where the media width for the print job is compared to a threshold. The threshold is typically set at the width of typical office paper (i.e. 8.5 inches wide).

When the media width is not greater than the threshold, flow moves to 662. At 662 the page is printed where each pass in the multi-pass print mode deposits the same percentage of the total amount of ink for a given segment of the image. Depositing the same percentage of the total amount of ink for a given segment of the image is known as an even distribution of ink. For example, in a two pass print mode each printing pass would deposit 50% of the ink for that segment of the page.

When the media width is greater than the threshold flow moves to 664. At 664 the page is printed where the last pass in the multi-pass print mode deposits more ink than earlier passes of the multi-pass print mode. Depositing different percentages of the ink in different passes for a given segment of the image is known as an uneven distribution of ink. For example, in a two pass print mode the first printing pass would deposit less ink than the second printing pass for a given segment of the page.

When using an uneven distribution of ink in a multi-pass printing mode, the distribution of ink between the printing passes can vary over a wide range of values. For example, a two pass printing mode may have only 5% of the ink deposited in the first pass and 95% of the ink deposited in the second pass. In another example the first printing pass may deposit 45% of the ink and the second pass may deposit 55% of the ink.

When using a multi-pass printing mode that has more than two printing passes, the distribution of ink between the earlier printing passes may use an even or uneven distribution. An example of an even distribution for earlier passes is depositing 10% of the ink in each of the first three printing passes of a four pass printing mode and depositing 70% of the ink in the last pass. An example of an uneven distribution for earlier passes is depositing 20% of the ink in the first printing pass of a three pass printing mode, depositing 30% of the ink in the second printing pass and depositing 50% of the ink in the last pass.

In one example, the distribution of ink between printing passes will be the same for each color of ink. For example, when using a four pass printing mode, in each of the first, second and third printing pass, 20% of the cyan ink, 20% of the magenta ink, and 20% of the yellow ink would be deposited. In the last pass 40% of the cyan, magenta and yellow ink would be deposited. In another example the distribution of ink between printing passes will be different for some colors. For example, in a two pass printing mode 95% of the yellow ink and 5% of the cyan and magenta ink will be deposited in the first printing pass and 5% of the yellow and 95% of the cyan and magenta ink will be deposited in the second printing pass. In some examples all the black ink will be deposited in the last printing pass. In other examples some of the black in will be deposited in the earlier printing passes and more will be deposited in the last printing pass.

The printer described above may be integrated into a multifunction peripheral (MFP). A multifunction peripheral (MFP) is a device that typically contains a printer and an imaging system, typically a scanner. The MFP can be used as a printer, a scanner, a copier, a facsimile machine (FAX) or the like. MFPs are also called all-in-one devices (AiO), multifunction devices, multifunction printers or the like.

What is claimed is:

1. A printer, comprising:
   a media feeding system for feeding media into a print zone along a first axis;
   a carriage to mount at least one printhead, the carriage attached to a drive system that moves the carriage in the print zone along a second axis perpendicular to the first axis;
   a controller coupled to the media feeding system, the drive system and the carriage;
   memory coupled to the controller, the memory having an ink control module loaded therein,
   the ink control module, when executed by the processor, causing the printer to print multiple swaths of ink onto media in the print zone without advancing the media, where the multiple swaths of ink are printed with a first ink distribution per swath when the width of media is below a threshold, and to print multiple swaths of ink with a second ink distribution per swath when the width of the media is not below the threshold, where the first ink distribution per swath is different than the second ink distribution per swath.

2. The printer of claim 1, where the second ink distribution has more ink printed in a last swath of the multiple swaths than in other of the multiple swaths.

3. The printer of claim 1, where the first ink distribution is an even ink distribution per swath and the second ink distribution is an uneven ink distribution per swath.

4. The printer of claim 1, where the width of the media is determined by an image file to be printed.

5. The printer of claim 1, where the width of the media is determined using an image sensor on the carriage.

6. The printer of claim 1, where the second ink distribution per swath is used for each of cyan, magenta, and yellow ink.

7. A method of printing using ink control, comprising:
   determining a width of media to be printed on;
   determining an amount of ink needed to print a segment of the media;
   printing the segment using multiple printing passes, where the amount of ink is divided between the multiple printing passes with a first distribution when the width is below a threshold, and the amount of ink is divided between the multiple printing passes with a second distribution, different than the first distribution, when the width is not below the threshold.

8. The method of printing using ink control of claim 7, where the second distribution has more ink printed in a last printing pass of the multiple printing passes than in other of the multiple printing passes.

9. The method of printing using ink control of claim 7, where the first distribution is an even distribution per printing pass and the second distribution is an uneven distribution per printing pass.

10. The method of printing using ink control of claim 7, where the width of the media is determined by a sensor in a paper path of printer.

11. The method of printing using ink control of claim 7, where the second ink distribution per printing pass is not the same for at least one of a cyan ink, a magenta ink or a yellow ink.

12. A non-transitory computer readable medium containing computer instructions that, when executed by a processor, print an image, comprising:
   determining a width of media to be printed on;
   determining an amount of ink needed to print a segment of the media;
   printing the segment using multiple printing passes, where the amount of ink is divided between the multiple printing passes with a first distribution when the width is below a threshold, and the amount of ink is divided between the multiple printing passes with a second distribution, different than the first distribution, when the width is not below the threshold.

* * * * *